United States Patent
Burgess

(10) Patent No.: US 11,441,368 B2
(45) Date of Patent: Sep. 13, 2022

(54) SPLIT-FLOW DEGASSER

(71) Applicant: BURGESS MANUFACTURING, LTD., Houston, TX (US)

(72) Inventor: Harry L. Burgess, Houston, TX (US)

(73) Assignee: Harry L. Burgess, Houston, TX (US)

( * ) Notice: Subject to any disclaimer, the term of this patent is extended or adjusted under 35 U.S.C. 154(b) by 0 days.

(21) Appl. No.: 16/545,798

(22) Filed: Aug. 20, 2019

(65) Prior Publication Data

US 2021/0054702 A1 Feb. 25, 2021

(51) Int. Cl.
*B01D 19/00* (2006.01)
*E21B 21/06* (2006.01)
*E21B 43/34* (2006.01)

(52) U.S. Cl.
CPC ........ *E21B 21/067* (2013.01); *B01D 19/0036* (2013.01); *B01D 19/0052* (2013.01); *E21B 43/34* (2013.01)

(58) Field of Classification Search
CPC ................ B01D 19/0052; B01D 19/00; B01D 19/0036; E21B 21/063–07; E21B 43/34–40
USPC ......................................................... 96/196
See application file for complete search history.

(56) References Cited

U.S. PATENT DOCUMENTS

| | | | |
|---|---|---|---|
| 1,220,810 A | 3/1917 | Alquist | |
| 3,201,919 A * | 8/1965 | Long | B01D 19/0057 95/254 |
| 3,256,957 A | 6/1966 | Miller | |
| 3,358,425 A * | 12/1967 | Burnham, Sr. | B01D 19/0042 96/195 |
| 3,616,599 A | 11/1971 | Burnham | |
| 3,625,310 A | 12/1971 | Herrick | |
| 3,895,927 A * | 7/1975 | Bournham, Sr. | E21B 21/067 96/163 |
| 3,973,930 A | 8/1976 | Burgess | |
| 3,990,539 A | 11/1976 | Marit | |
| 3,999,965 A | 12/1976 | Burgess | |
| 4,084,946 A | 4/1978 | Burgess | |
| 4,088,457 A | 5/1978 | Phillips et al. | |
| 4,201,555 A | 5/1980 | Tkach | |
| 4,326,863 A | 4/1982 | Day et al. | |
| 4,365,977 A * | 12/1982 | Egbert | E21B 21/067 95/248 |
| 4,394,140 A * | 7/1983 | Liljestrand | E21B 21/067 55/406 |
| 4,416,672 A | 11/1983 | Underwood | |
| 4,573,373 A | 3/1986 | Shimizu et al. | |

(Continued)

*Primary Examiner* — Robert A Hopkins
(74) *Attorney, Agent, or Firm* — Patterson + Sheridan, LLP

(57) ABSTRACT

Techniques for improving a drilling fluid flow rate of a drilling fluid degasser by splitting the flow of the drilling fluid (e.g., drilling mud) are provided. An exemplary apparatus for degassing drilling fluid generally includes a pressure vessel; a vacuum blower in fluid communication with the pressure vessel; a slotted centrifuge tube having a cross-sectional area; a motor configured to power the vacuum blower and rotate the slotted centrifuge tube; an evacuation pump having an impeller connected with a lower end of the slotted centrifuge tube; and an inlet pipe spaced a distance away from the lower end of the slotted centrifuge tube, wherein the distance is based on a relationship between a cross-sectional area of the inlet pipe and the cross-sectional area of the slotted centrifuge tube.

8 Claims, 6 Drawing Sheets

(56) References Cited

U.S. PATENT DOCUMENTS

| | | | |
|---|---|---|---|
| 4,609,385 A | | 9/1986 | Burgess |
| 4,630,711 A | | 12/1986 | Levrai et al. |
| 4,668,251 A | * | 5/1987 | Burgess ................ E21B 21/067 |
| | | | 96/174 |
| 4,872,530 A | | 10/1989 | Burgess |
| 5,002,657 A | * | 3/1991 | Botts ...................... B01D 17/00 |
| | | | 210/115 |
| 5,143,525 A | * | 9/1992 | Sotirianos .............. B01D 19/02 |
| | | | 95/242 |
| 6,730,146 B2 | * | 5/2004 | Shah .................. B01D 19/0042 |
| | | | 96/198 |
| 7,794,527 B2 | * | 9/2010 | Sterner ................ E21B 21/067 |
| | | | 96/157 |

\* cited by examiner

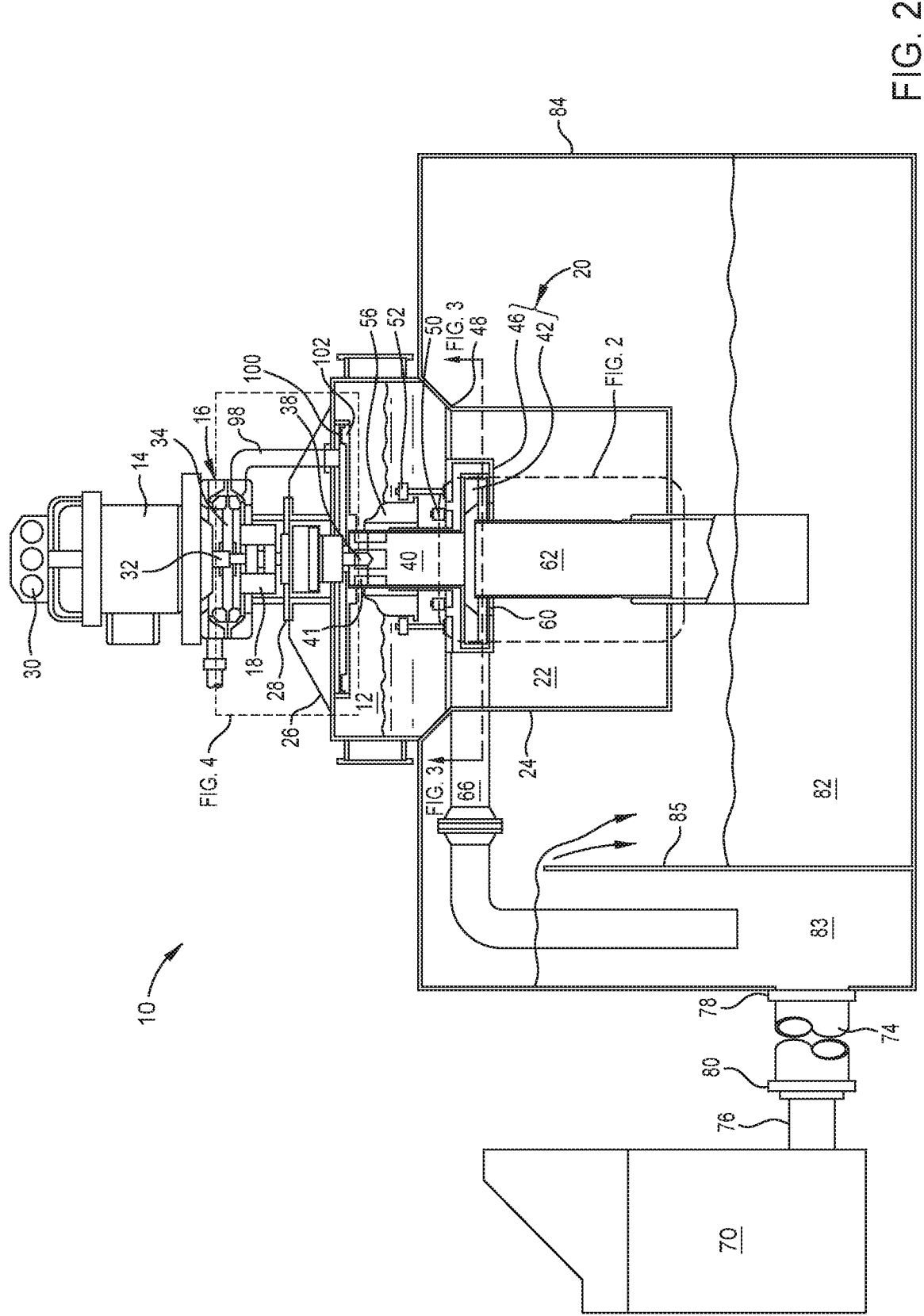

SPLIT-FLOW DEGASSER

BACKGROUND

Technical Field

Aspects of the present disclosure relate to apparatuses and techniques for degassing drilling fluids, e.g., drilling mud.

Description of the Related Art

In the drilling of deep boreholes to form wells, such as hydrocarbon producing wells, a typical practice is to penetrate the earth with a drill bit supported on a drill string in the bore of the well being drilled. It is desirable to lubricate the drill bit and protect the well against blowouts by circulating drilling fluid (e.g., drilling mud) under pressure through the drill string down to and through the drill bit and then up the annulus between the drill string and the borehole. Fluid coming up the annulus between the drill string and the borehole is typically passed through a suitable device, such as a shaker, in order to remove drill cuttings and other objects, and is then typically delivered to a reservoir, such as a mud tank, to be made available to a pump (e.g., a mud pump) for pumping into the borehole again (i.e., the drilling fluid is recirculated and thus flowed back through the drill string and annulus).

A typical drilling fluid pump (e.g., a mud pump) may be a duplex or triplex pump that includes reciprocating pistons mounted in cylinders for pressurizing the incoming drilling fluid (e.g., mud from a mud reservoir), which is then flowed to a drill string, and thus to the well bore, under pressure.

It is desirable to remove entrained gases such as air, methane, hydrogen sulfide, etc., from drilling fluid before it is delivered to a drilling fluid pump as is illustrated, for example, by Burgess U.S. Pat. No. 3,973,930, Burgess U.S. Pat. No. 3,999,965 and Burgess U.S. Pat. No. 4,084,946. Gases present in the drilling fluid reduce the lubricating capacity of the drilling fluid, may induce damage to pump components (e.g., impellers) by causing cavitation, and may result in hazardous drilling operations, as gas bubbles in drilling fluid reduce the weight of the drilling fluid per unit volume, and thus decrease the weight of the drilling fluid at a formation being drilled through, reducing the capacity of the drilling fluid to prevent a blowout of the well.

Drilling boreholes at a faster rate allows the boreholes to be drilled more cheaply. Increasing drilling fluid flow rates may enable improvements in drilling rates. Increasing drilling fluid flow rates may be enabled by increasing drilling fluid flow rates through degassing equipment. Therefore, it is desirable to develop improvements to techniques for degassing drilling fluids and pumping drilling fluids at increased drilling fluid flow rates to enable improvements in drilling rates.

SUMMARY

The disclosed apparatus has several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include increased drilling fluid flow rates from degassers.

Aspects of the present disclosure generally relate to a split-flow degasser. An exemplary apparatus operating according to aspects of the present disclosure splits a flow of drilling fluid into two flows including a first flow that flows through an upper portion of a degassing chamber of a degasser and a second flow that flows through a channel between an inlet conduit and a slotted centrifuge tube.

Certain aspects of the present disclosure provide an apparatus for degassing drilling fluid (e.g., drilling mud). The apparatus generally includes a pressure vessel; a vacuum blower in fluid communication with the pressure vessel; a slotted centrifuge tube having a cross-sectional area; a motor configured to rotate the slotted centrifuge tube; an evacuation pump having an impeller connected with a lower end of the slotted centrifuge tube; and an inlet pipe spaced a distance away from the lower end of the slotted centrifuge tube, wherein the distance is based on a relationship between a cross-sectional area of the inlet pipe and the cross-sectional area of the slotted centrifuge tube.

Certain aspects of the present disclosure provide a method for degassing drilling fluid (e.g., drilling mud) in a degasser. The method generally includes splitting a first flow of drilling fluid into a second flow, through a channel between an inlet pipe of the degasser and a slotted centrifuge tube of the degasser, and a third flow, through the slotted centrifuge tube; exposing the drilling fluid in the second flow to a first area of low pressure in the degasser; and exposing the drilling fluid in the third flow to a second area of low pressure in the degasser.

BRIEF DESCRIPTION OF THE DRAWINGS

So that the manner in which the above recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 2 is a cross-sectional view of a degasser, in accordance with certain aspects of the present disclosure.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Aspects of the present disclosure provide an apparatus for improving a fluid flow rate of a degasser by splitting the flow of the incoming fluid. Drilling mud is one fluid that can be degassed using the methods and apparatus disclosed herein. Embodiments will be described herein in terms of drilling mud degassers, but are not limited to drilling muds. One exemplary split-flow degasser generally includes a slotted centrifuge tube and an inlet conduit, wherein the inlet conduit is of the same or larger diameter than a diameter of the slotted centrifuge tube and positioned at a distance from the slotted centrifuge tube, such that a first portion of drilling fluid exiting the inlet conduit enters the slotted centrifuge tube and a second portion of the drilling fluid exiting the inlet conduit enters an evacuation pump of the split-flow degasser.

The word "exemplary" is used herein to mean "serving as an example, instance, or illustration." Any aspect described herein as "exemplary" is not necessarily to be construed as preferred or advantageous over other aspects.

Figure 1:
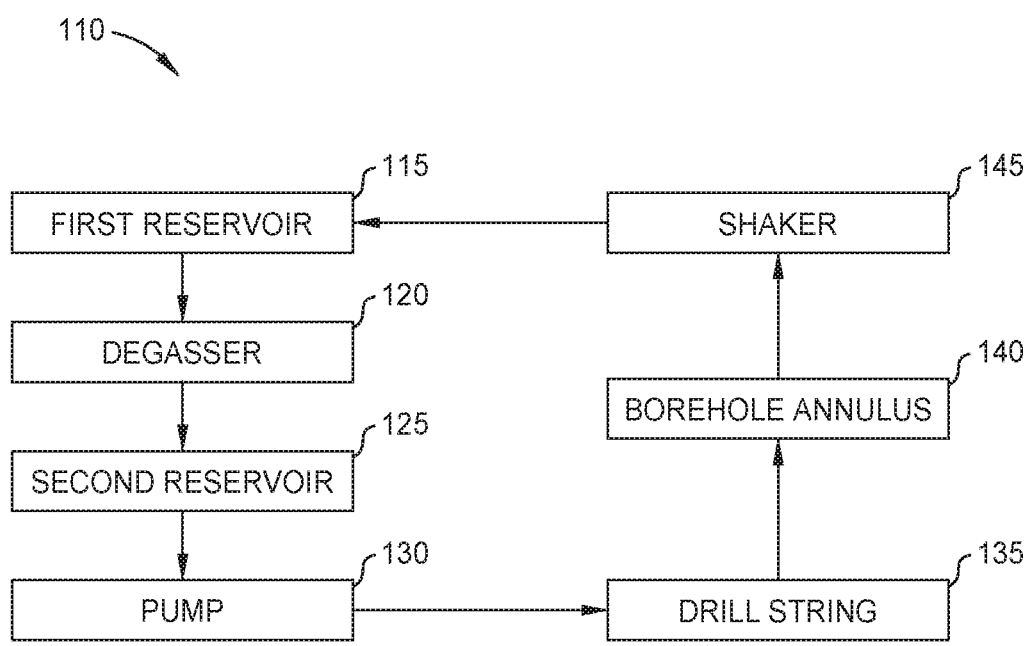
FIG. 1 is a schematic diagram of drilling fluid flow in a drilling operation, in accordance with certain aspects of the present disclosure.

FIG. 1 is a schematic diagram 110 of drilling fluid (e.g., drilling mud) flow in a drilling operation, in accordance with certain aspects of the present disclosure. As illustrated, drilling fluid in a first reservoir 115 moves into a split-flow degasser 120. As described below, the drilling fluid is sucked into the degasser 120 during operation of the degasser. The drilling fluid is degassed in the degasser 120 and is pumped by the degasser 120 to a second reservoir 125. From the second reservoir 125, the drilling fluid moves to a pump 130 (e.g., a mud pump). The pump 130 pumps the degassed drilling fluid down the drill string 135. The degassed drilling fluid exits the drill string 135 and enters a borehole annulus 140 between the drill string 135 and walls of the borehole. The drilling fluid may adsorb, absorb, and/or entrain gases while moving upward in the borehole annulus 140. The drilling fluid may also entrain cuttings from the drilling operation while moving upward in the borehole annulus 140. Upon reaching the top of the borehole, the drilling fluid moves (e.g., via a pipe) to a shaker 145, which separates the cuttings from the drilling fluid. The drilling fluid may adsorb, absorb, and/or entrain gases while the shaker acts on the drilling fluid. From the shaker, the drilling fluid moves (e.g., via a pipe) back to the first reservoir 115.

Thus, in a drilling operation utilizing the split-flow degasser 10 illustrated in FIG. 2 (described in more detail below), mud is held in a first reservoir 82, which may be an example of the first reservoir 115 shown in FIG. 1, of a mud tank 84. The mud flows into the inlet conduit 62 of the split-flow degasser 10. The mud is sucked into the split-flow degasser 10 due to reduced pressure therein, as compared to the mud in the conduit 62, created by operation of an evacuation pump 20 and a vacuum blower 16 in the degasser 10. Degassed mud is pumped out of the split-flow degasser 10 by the evacuation pump 20 via an outlet conduit 66. The degassed mud flows from outlet conduit 66 into the second reservoir 83, which may be an example of the second reservoir 125 shown in FIG. 1.

During operation of the degasser 10, drilling fluid flows up the inlet conduit 62. A first portion of the drilling fluid from the inlet conduit 62 follows a first path by entering the evacuation pump 20. Gases dissolved in this first portion of the drilling fluid may come out of solution (i.e., effervesce) due to the drilling fluid being exposed to the reduced pressures caused by operation of the evacuation pump 20. Impact of blades of the evacuation pump impeller 42 on the first portion of the drilling fluid may also cause gas bubbles entrained in the drilling fluid to separate from the drilling fluid. The gases coming out of solution and separating from the drilling fluid flow back toward the center of the impeller and up a slotted centrifuge tube 40, into a degassing chamber 12 of a pressure vessel 24, and are evacuated via a vacuum blower 16 connected to the degassing chamber 12.

A second portion of the drilling fluid from the inlet conduit 62 follows a second path by entering the slotted centrifuge tube 40. The second portion of the drilling fluid exits the slotted centrifuge tube 40 via slots 41 and enters the degassing chamber 12. Gases entrained in this second portion of the drilling fluid (e.g., bubbles formed by the gases coming out of solution and bubbles entrained in the drilling fluid in the mud tank) effervesce from the drilling fluid in the degassing chamber 12 and are pumped out of the split-flow degasser 10 by the vacuum pump 16. Drilling fluid that exits the slotted centrifuge tube 40 into the degassing chamber 12 flows downward and enters a drilling fluid chamber 22 within the pressure vessel 24. By splitting the drilling fluid flow into two paths, the described split-flow degasser 10 provides degassed drilling fluid at a higher flow rate than previously known degassers, which have drilling fluid follow a single path through the degassers.

FIG. 2 shows a schematic cross sectional view of a split-flow degasser 10, in accordance with aspects of the present disclosure. The degasser includes a pressure vessel 24 containing the degassing chamber 12 and the drilling fluid chamber 22. A vacuum motor support 26 is mounted on the pressure vessel 24, and vacuum blower brackets 28 mounted on the vacuum motor support 26 support a vacuum blower 16, such as a regenerative vacuum blower, of the degasser. The vacuum blower has a vacuum blower impeller 34. A gear box 18 is supported by the vacuum blower 16 and has a sun gear (not shown) and at least one planetary gear (not shown). A motor, such as an electrically or hydraulically powered motor 14, is mounted on the vacuum blower 16 and has a drive shaft 32 that extends into driving engagement with the vacuum blower impeller 34 and the sun gear. A foam separation impeller 102 is connected with a gear shaft 38 that is connected with a carrier (not shown) of the planetary gear and extends from the gear box 18. A slotted centrifuge tube 40 is also connected with the gear shaft 38. The degasser also includes an evacuation pump 20 having a housing 46 and an evacuation pump impeller 42. The evacuation pump impeller 42 is within the housing 46 and is connected with and driven by the slotted centrifuge tube 40. To facilitate movement and repair of the degasser 10, handling brackets 30 may be provided on the top of the motor 14 to which the hook of a crane or other appropriate transfer apparatus or system (not shown) may be attached.

As described above, the foam separation impeller 102 is rotatably secured to the gear shaft 38 extending from the gear box 18. The gear shaft 38 is also rotatably secured to the top of the slotted centrifuge tube 40. With this construction, the vacuum blower 16 can be operated at an appropriate speed necessary for the generation of a vacuum of about 10 to 15 inches of mercury, as compared to atmospheric pressure, within the degassing chamber 12, while the foam separation impeller 102, the slotted centrifuge tube 40, and the evacuation pump impeller 42 may be rotated at a different and more appropriate, e.g., slower, rate.

The centrifuge tube 40 includes a plurality of slots 41 extending through the wall thereof. The slots 41 are each generally aligned parallel to the centerline of the centrifuge tube 40 and are equally spaced about the circumference thereof. The slots 41 are located at the upper end of the centrifuge tube 40 adjacent to the foam separation impeller 102, the slots 41 terminating within the volume of the degassing chamber 12. Cross braces 48 mounted in the cylindrical vessel 24 support lower stops 50 and upper stops 52 for limiting the vertical travel of an annular float 56. Float 56 is a tube that is buoyant on the drilling fluid present in the degassing chamber 12. Float 56 extends around the centrifuge tube 40 and is freely moveable in the axial direction of the centrifuge tube 40. Based on the volume of liquid, essentially drilling fluid (e.g., drilling mud) and any entrained gas or other material in the degassing chamber 12, and thus the upper surface of the liquid, the vertical position of the float relative to the slots 41 is established. The location of the slots 41 relative to the base of the degassing chamber 12 is such that when the liquid level in the degassing chamber is low and the float 56 is blocked from moving further toward the base of the degassing chamber by the stops 50, no portion of the slots 41 is blocked by the float 56. Similarly, when the liquid level is high in the degassing chamber 12 and further movement of the float 56 away from the base of the degassing chamber 12 is prevented by stops 52, a maximum area of the slots 41 are blocked by the float 56. The unblocked area of each of the slots 41, through which drilling fluid may exit the centrifuge tube 40 and enter the degassing chamber 12, is determined by the relative position of the float 56. Thus, as the degassing chamber 12 fills with drilling fluid, the annular float 56 rises (i.e., floats up), blocks more of the area of each of the slots 41 of the centrifuge tube 40, and restricts the rate at which drilling fluid can enter the degassing chamber 12 from the centrifuge tube 40. When the liquid level in the degassing chamber 12 drops, a greater unblocked area of the slots 41 results and drilling fluid can enter the degassing chamber 12 through the slots 41 at a greater rate.

A drilling fluid inlet 60 in the bottom of the housing 46 of the evacuation pump 20 enables drilling fluid to flow into the evacuation pump 20. Drilling fluid (e.g., drilling mud) is delivered to the slotted centrifuge tube 40 by an inlet conduit 62 that terminates inside the housing 46 of the evacuation pump 20. The top of the inlet conduit 62 is spaced from the lower end of the slotted centrifuge tube 40 so that a channel is formed between the top end of the inlet conduit 62 and the lower end of the slotted centrifuge tube 40. The channel enables drilling fluid from the inlet conduit 62 to enter the evacuation pump, i.e., to follow the first path described herein. The resultant flow of fluid from the inlet conduit 62 into the evacuation pump 20 provides a low pressure area for high efficiency scavenging of entrained gases. Also, because the inlet conduit 62 is spaced apart from the lower end of the slotted centrifuge tube 40, the rotating centrifuge tube 40 can rotate freely without bearing upon the top of the inlet conduit 62 and there is no need for bearings and seals at the lower end of the slotted centrifuge tube 40.

An outlet line or conduit 66 is connected with the discharge side of the evacuation pump 20 and extends through the wall of the cylinder 24 (see FIG. 4 below). Degassed drilling fluid from the evacuation pump 20 flows via the outlet conduit 66 into a second reservoir 83 of the mud tank for storage.

A conduit 74 (e.g., a flexible hose) connects to the second reservoir 83 and, in turn, is connected to a mud pump inlet line 76. The conduit 74, which may be flexible in order to ease alignment of the conduit to the mud pump inlet line 76, may be secured to the second reservoir 83 of the mud tank 84 by a clamp 78 and to the mud pump inlet line 76 by another clamp 80.

The second reservoir 83 is separated from the first reservoir 82 within the mud tank by a partition 85. If degassed drilling fluid is pumped into the second reservoir 83 faster than a mud pump 70 pumps the degassed drilling fluid out of the second reservoir 83, then excess degassed drilling fluid flows over the partition 85 and into the first reservoir 82.

Figure 3A:
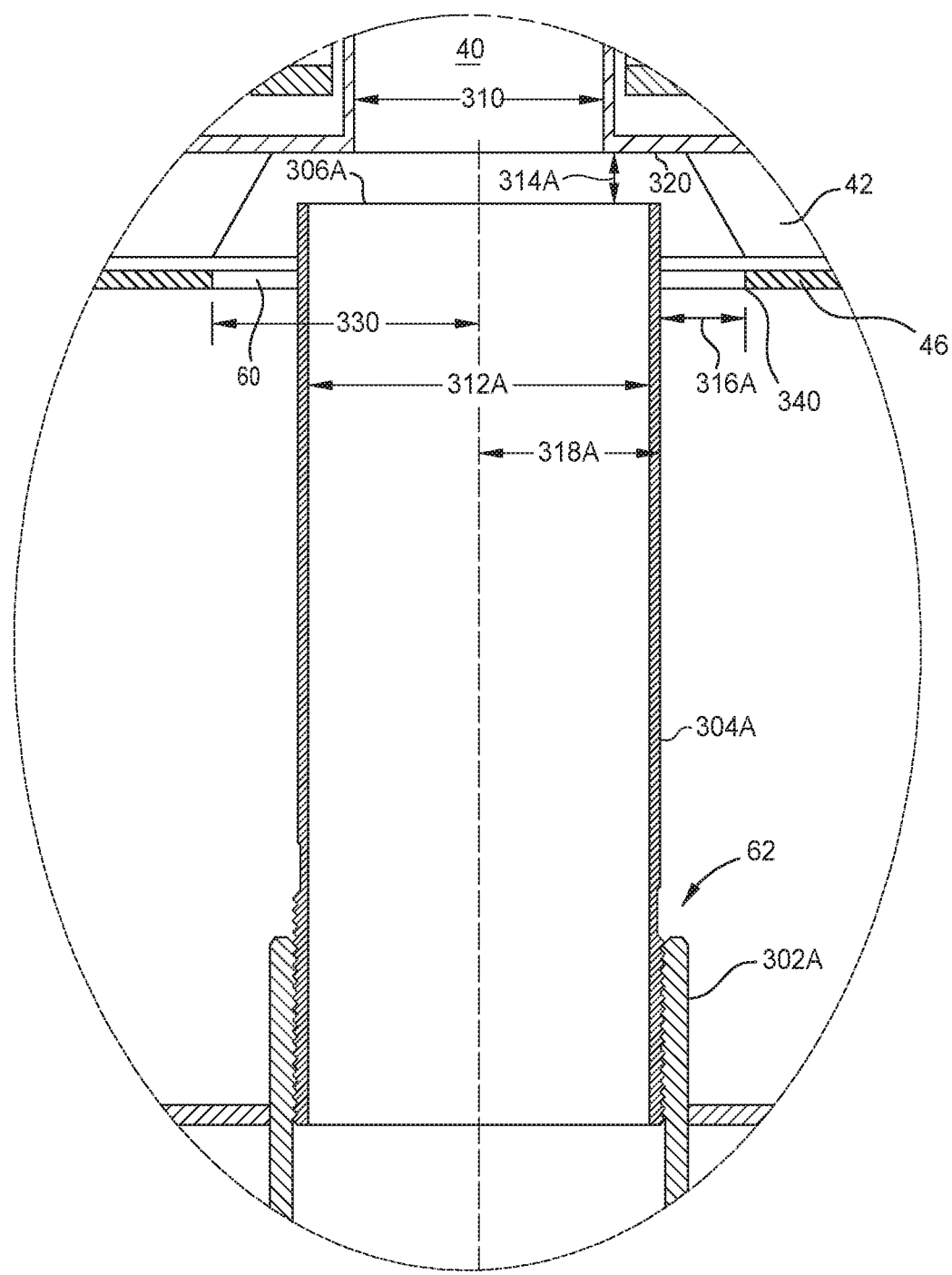
FIGS. 3A and 3B are schematic cross-sectional views of inlet conduits of the degasser shown in FIG. 2.
Figure 3B:
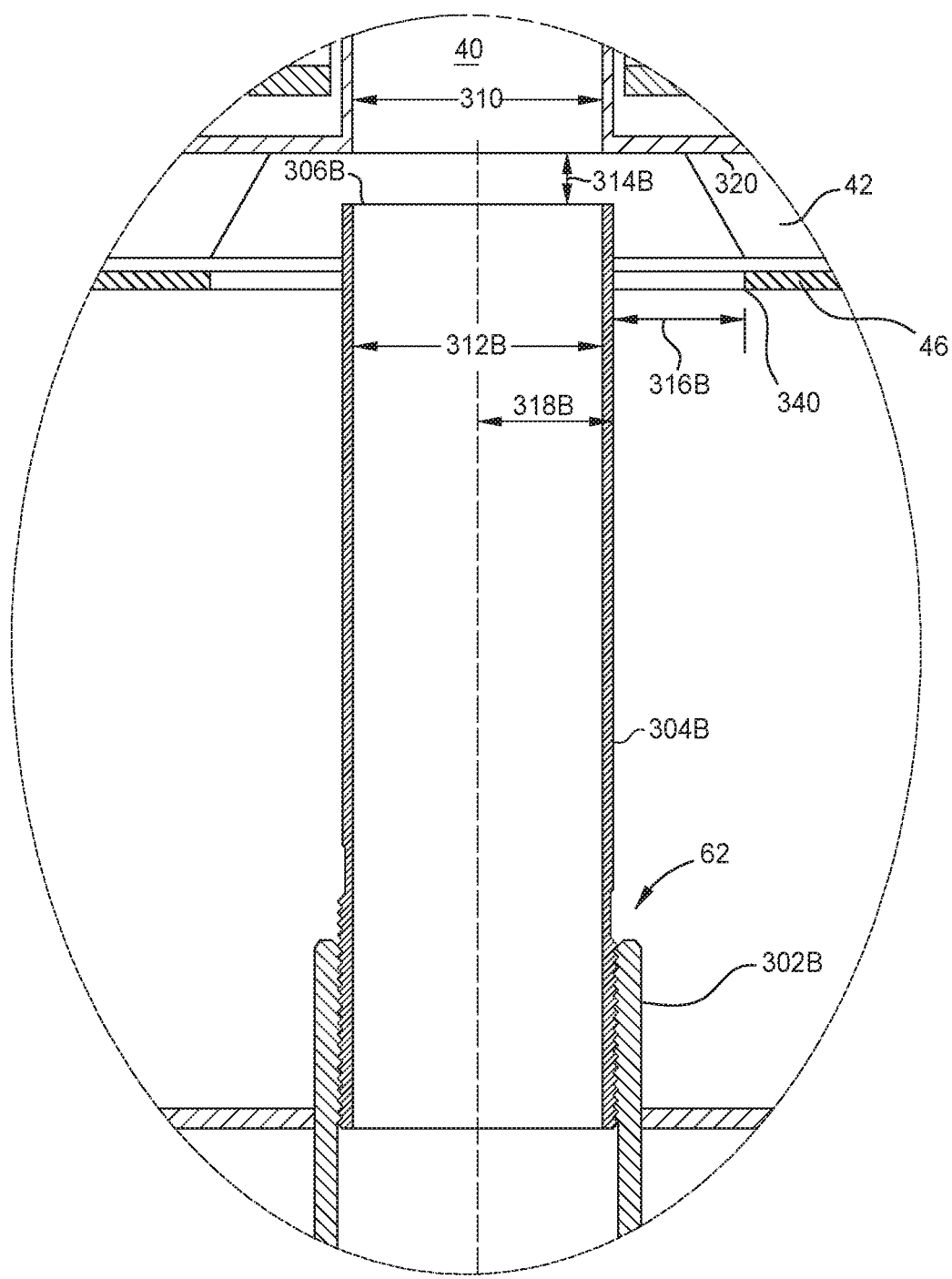

FIGS. 3A and 3B are schematic cross-sectional views of exemplary inlet conduits 62 of the degasser 10 shown in FIG. 2, in accordance with aspects of the present disclosure.

FIG. 3A shows an exemplary inlet conduit 62 with an inner diameter 312A that is larger than an inner diameter 310 of the slotted centrifuge tube 40. The inlet conduit 62 includes a threaded fitting 302A and an inlet pipe 304A. The inlet pipe 304A is threaded into the threaded fitting 302A and thus, by rotating the inlet pipe 304A in the threads of the threaded fitting 302A, the distance 314A of the upper end 306A of the inlet pipe 304A from the lower end 320 of the slotted centrifuge tube 40 is adjusted or set. As a result, the distance 314A between the upper end 306A of the inlet pipe 304A and a lower end 320 of the slotted centrifuge tube 40 is user selectable, and adjustable. This distance 314A is set to provide a flow path of drilling fluid laterally out of the inlet conduit and into the impeller 42 of the evacuation pump 20. The distance 314A may be set based on a relationship between a cross-sectional area of the inlet conduit 304A and a cross-sectional area of the slotted centrifuge tube 40.

According to aspects of the present disclosure, an internal diameter 312A of the inlet pipe 204 may be related to an internal diameter 310 of the slotted centrifuge tube 40 such that a ratio of a cross-sectional area $A_4$ of the inlet pipe 304A to a cross-sectional area $A_1$ of the slotted centrifuge tube 40 is about 1.8 (i.e., 1.6 to 2.0). For example, if the internal diameter 310 of the slotted centrifuge tube 40 is 6 inches, then $A_1$ will be approximately 28 square inches (sq. in.). In the example, the internal diameter 312A of the inlet pipe 304A may be 8 inches, so that $A_4$ is approximately 50 square inches, and the ratio of $A_4:A_1$ is about 1.8.

In aspects of the present disclosure, the inlet pipe 304A may be positioned (i.e., rotated in the threaded fitting 302A, as described above) such that the outer circumferential surface area $A_2$ of a cylinder (representing an area through which drilling mud can flow laterally out of the inlet conduit 62 and into the impeller 42, i.e., via the first path) between the upper end 306A of the inlet pipe 304A and the lower end 320 of the slotted centrifuge tube 40 may be selected. That is, if H represents the distance 314A and D represents the internal diameter 312A of the inlet pipe 304A, then the outer circumferential surface area of the cylinder between the upper end 306A of the inlet pipe 304A and the lower end 320 of the slotted centrifuge tube 40 has a surface area $A_2=\pi DH$. Rotating the inlet pipe 304A in the threaded fitting 302A controls the axial positioning of the inlet pipe 304A and the value of H, which (as shown above) is a factor in the circumferential surface area $A_2$ of the cylinder between the upper end 306A of the inlet pipe 304A and the lower end 320 of the slotted centrifuge tube 40. The circumferential surface area $A_2$ represents the area through which drilling mud can flow from the inlet pipe 304A into the evacuation pump 20, and the size of that circumferential surface area is one factor controlling the flow rate of drilling mud from the inlet pipe 304A into the evacuation pump 20.

According to aspects of the present disclosure, during operation of the split-flow degasser 10, drilling mud flows from the inlet pipe 304A via a first path through the outer circumferential surface area $A_2$ of the above-described cylinder (i.e., between the inlet pipe 304A and the lower end 320 of the slotted centrifuge tube 40) into the evacuation pump 20 and via a second path into the slotted centrifuge tube 40 (i.e., through cross-sectional area $A_1$ of the slotted centrifuge tube 40). A ratio of mud flowing into the evacuation pump 20 from the inlet pipe 304A to mud flowing into the slotted centrifuge tube 40 may be approximated by a ratio of the outer circumferential surface area $A_2$ of the cylinder between the inlet pipe 304A and the lower end 320 of the slotted centrifuge tube 40 to the cross-sectional area $A_1$ of the slotted centrifuge tube 40.

In aspects of the present disclosure, the inlet pipe 304A may be positioned such that the outer circumferential surface area $A_2$ of the cylinder between the upper end 306A of the inlet pipe 304A and the lower end 320 of the slotted centrifuge tube 40 is approximately 0.8 times the cross-sectional area $A_1$ of the slotted centrifuge tube 40. That is, if H represents the distance 314A and D represents the internal diameter 312A of the inlet pipe 304A, then the outer circumferential surface of the cylinder between the upper end 306A of the inlet pipe 304A and the lower end 320 of the slotted centrifuge tube 40 has a surface area $A_2 = \pi DH$, and the inlet pipe 304A may be positioned such that $A_2 = \pi DH = 0.8 = A_1$. Continuing the example from above in which $A_4 = 1.8 \times A_1$, if the internal diameter 310 of the slotted centrifuge tube 40 is 6 inches, then $A_1$ is approximately 28 square inches, $A_4$ is approximately 50 square inches, and the internal diameter 312A (i.e., D) is approximately 8 inches. Still in the example, $A_2 = 0.8 \times 28$ sq. in. 22 sq. in. $= \pi \times 8 \times H$, and solving for H yields H≈0.875 in. (i.e., ⅞ in.).

According to aspects of the present disclosure, the internal radius 330 of the lowermost extrema 340 of the drilling fluid inlet 60 of the pump cover 46 is configured such that the cross-sectional area $A_3$ of an annulus 316A between the lowermost extrema 340 drilling fluid inlet 60 of the pump cover 46 and the inlet pipe 304A is about 3.2 times the cross-sectional area $A_1$ of the slotted centrifuge tube 40. That is, the drilling fluid inlet 60 of the pump cover 46 is configured so that the internal radius 330, of the lowermost extrema 340 of the drilling fluid inlet 60, is of a size such that $A_3 \approx 3.2 \times A_1$. If the radius 330 of the drilling fluid inlet 60 of the pump cover 46 is represented by $R_3$, and the external radius 318A of the inlet pipe 304A is represented by $R_4$, then the area of the annulus is calculated as $\pi (R_3^2 - R_4^2)$. Continuing the example from above, if the internal diameter 310 of the slotted centrifuge tube 40 is 6 inches, then $A_1$ will be approximately 28 sq. in., and the cross-sectional area, $A_3$, of the annulus 316A is about 3.2×28 sq. in.≈90 sq. in. In the example, if the external radius $R_4$ of the inlet pipe 304A is 4.125 inches, then the cross-sectional area $A_3 \approx 90$ sq. in.≈π $(R_3^2 - 17$ sq. in.$)$, and solving for $R_3$ yields $R_3 \approx 6.8$ in.

FIG. 3B shows an exemplary inlet conduit 62 with an inner diameter 312B that is equal to the inner diameter 310 of the slotted centrifuge tube 40. As described above, the inlet conduit 62 includes a threaded fitting 302B and an inlet pipe 304B. The inlet pipe 304B is threaded into the threaded fitting 302B and thus, by rotating the inlet pipe 304B in the threads of the threaded fitting 302B, the distance 314B of the upper end 306B of the inlet pipe 304B from the lower end 320 of the slotted centrifuge tube 40 is adjusted or set. As a result, the distance 314B between the upper end 306B of the inlet pipe 304B and a lower end 320 of the slotted centrifuge tube 40 is user selectable, and adjustable.

In aspects of the present disclosure, the inlet pipe 304B may be positioned (i.e., rotated in the threaded fitting 302B, as described above) such that the outer circumferential surface area $A_2$ of a cylinder (representing an area through which drilling mud can flow) between the upper end 306B of the inlet pipe 304B and the lower end 320 of the slotted centrifuge tube 40 may be selected. That is, if H represents the distance 314B and D represents the internal diameter 312B of the inlet pipe 304B, then the outer circumferential surface area of the cylinder between the upper end 306B of the inlet pipe 304B and the lower end 320 of the slotted centrifuge tube 40 has a surface area $A_2 = \pi DH$. Rotating the inlet pipe 304B in the threaded fitting 302B controls the axial positioning of the inlet pipe 304B and the value of H, which (as shown above) is a factor in the circumferential surface area $A_2$ of the cylinder between the upper end 306B of the inlet pipe 304B and the lower end 320 of the slotted centrifuge tube 40. The circumferential surface area $A_2$ represents the area through which drilling mud can flow from the inlet pipe 304B into the evacuation pump 20, and the size of that circumferential surface area is one factor controlling the flow rate of drilling mud from the inlet pipe 304B into the evacuation pump 20.

According to aspects of the present disclosure, during operation of the split-flow degasser 10, drilling mud flows from the inlet pipe 304B via a first path through the outer circumferential surface area $A_2$ of the cylinder between the inlet pipe 304B and the lower end 320 of the slotted centrifuge tube 40 into the evacuation pump 20 and via a second path through cross-sectional area $A_1$ of the slotted centrifuge tube 40 into the slotted centrifuge tube 40. A ratio of mud flowing into the evacuation pump 20 from the inlet pipe 304B to mud flowing into the slotted centrifuge tube 40 may be approximated by a ratio of the outer circumferential surface area $A_2$ of the cylinder between the inlet pipe 304B and the lower end 320 of the slotted centrifuge tube 40 to the cross-sectional area $A_1$ of the slotted centrifuge tube 40.

In aspects of the present disclosure, drilling mud flows through the degasser 10 (see FIG. 2) via two paths. Each of the two paths includes mud entering the degasser 10 from the mud tank 84 via the inlet conduit 62. In the first path, mud begins swirling (e.g., due to rotation of the slotted centrifuge tube 40 and/or rotation of the evacuation pump impeller 42) within the inlet conduit 62, releases entrained gases due to exposure of the drilling mud to low pressure (described in more detail below) within the pressure vessel 24, and exits the inlet conduit 62 via the gap or channel (illustrated at 314A in FIG. 3A or 314B in FIG. 3B) between the inlet conduit 62 and the slotted centrifuge tube 40. The mud then contacts the evacuation pump impeller 42, releases entrained gases due to the impact of the impeller blade on the mud, and is pumped by the impeller to flow through the outlet conduit 66. In the second path, mud exits the inlet conduit 62 and enters the slotted centrifuge tube 40. The mud flows up the slotted centrifuge tube 40 and is propelled radially through one of the slots 41 due to the rotation of the slotted centrifuge tube 40. The mud propelled from the slots 41 may impact the splatter plate 100, the interior of the pressure vessel 24, or on the surface of mud in the degassing chamber 12. The mud releases entrained gases while flying through the degassing chamber 12 and/or on impact with one of the splatter plate 100, pressure vessel 24, or the surface of the mud in the degassing chamber 12. This mud moves downwardly within the pressure vessel 24, past the braces 48 into the drilling fluid chamber 22, and is eventually drawn into the drilling fluid inlet 60 by suction generated by rotation of the evacuation pump impeller 42. The mud then enters the evacuation pump impeller 42 and is pumped by the impeller to flow through the outlet conduit 66. As mentioned above, the area, $A_2$, for the first path from the inlet conduit 62 into the evacuation pump impeller 42 (i.e., via the gap at 314A in FIG. 3A) may be approximately 0.8 times the cross-sectional area, $A_1$, of the second path from the inlet conduit 62 into the slotted centrifuge tube 40.

In order to prevent the entrainment of drilling mud droplets in the gases withdrawn through the gas evacuation suction pipe 98, a splatter plate 100 is provided in the degassing chamber 12, and a foam separation impeller 102 is provided adjacent the top of the degassing chamber 12 so that gas liberated in the degassing chamber 12 must follow a sinuous path to arrive at the upper chamber gas evacuation suction pipe 98. The sinuous path includes the gases moving from the degassing chamber 12 to the outer part of the foam separation impeller 102 and splatter plate 100, from the outer part of the foam separation impeller 102 and splatter plate 100 to the inner part of the splatter plate 100, upward through holes in the splatter plate 100, above the splatter plate 100 to the outer part of the splatter plate 100, and then upward into the gas evacuation suction pipe 98. This path is represented by the arrows shown on FIG. 5.

According to aspects of the present disclosure, a density of drilling fluid may vary with the concentration of gases entrained in the drilling fluid. The described split-flow degasser may take advantage of the variation in density of the drilling fluid in that drilling fluid entering the degasser via the inlet pipe 304A or 304B begins swirling in response to spinning of the impeller 42 and the slotted centrifuge tube 40. The swirling will cause denser drilling fluid (e.g., mud without entrained gases) to move to the outside of the inlet pipe 304A or 304B, pass through the gap 314A or 314B (i.e., via the first path), and flow into the impeller 42 to be pumped to the second reservoir 83. Drilling fluid that is less dense (e.g., mud with entrained gases) will tend to move upward in the slotted centrifuge tube 40 (i.e., via the second path) and then be flung radially into the degassing chamber 12.

In aspects of the present disclosure, the vacuum blower 16 can create a vacuum (pressure difference) of ten to twelve inches of mercury within the slotted centrifuge tube 40 as compared to atmospheric pressure, which helps draw mud into the slotted centrifuge tube 40 from the inlet conduit 62.

According to aspects of the present disclosure, the evacuation pump impeller 42 may be turned at a rate sufficient to generate a vacuum of about sixteen inches of mercury at locations 314A (see FIG. 3A) or 314B (see FIG. 3B) as compared to atmospheric pressure, thus causing mud to enter the evacuation pump impeller 42 from the inlet conduit 62.

Figure 4:
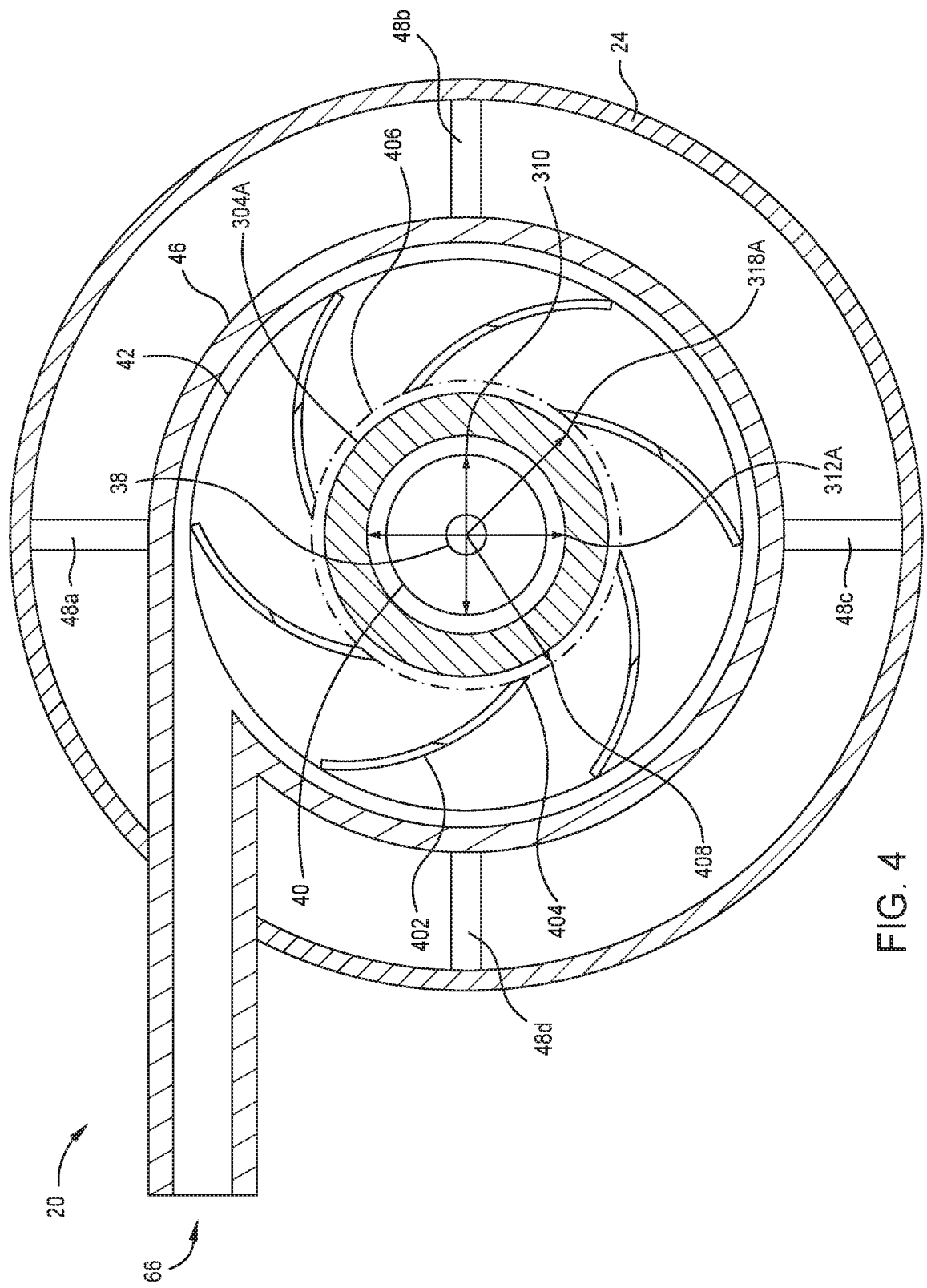
FIG. 4 is a schematic cross-sectional view of the inlet pipe and evacuation pump of the degasser shown in FIG. 2.

FIG. 4 is a schematic cross-sectional enlarged view of the inlet pipe 304A and evacuation pump 20 of the degasser 10 shown in FIG. 2. The gear shaft 38 is shown where it connects to the top end of the slotted centrifuge tube 40. The gear shaft 38, slotted centrifuge tube 40, inlet pipe 304A, and impeller 42 all share a common central axis. The outlet conduit 66 connects to the housing 46 of the evacuation pump 20, as shown. As described above, the internal diameter 312A of the inlet pipe 304A is larger than the internal diameter 310 of the slotted centrifuge tube 40. However, as illustrated in FIG. 3B, the disclosure is not so limited, and the internal diameter 312B of the inlet pipe 304B may be the same size as the internal diameter 310 of the slotted centrifuge 40. The inlet pipe 304A may be selected to have an internal diameter 312A calculated according to the calculations previously described. Similarly, the inlet pipe 304A may be selected to have an external radius 318A calculated according to the calculations previously described. A plurality of blades 402 are attached to a face of the impeller 42. Each of the blades 402 tapers toward the center of the impeller 42. Each blade 402 has an internal end 404, and a circle 406 inscribed through the internal ends has a larger radius 408 than the external radius 318A of the inlet pipe 304A.

Figure 5:
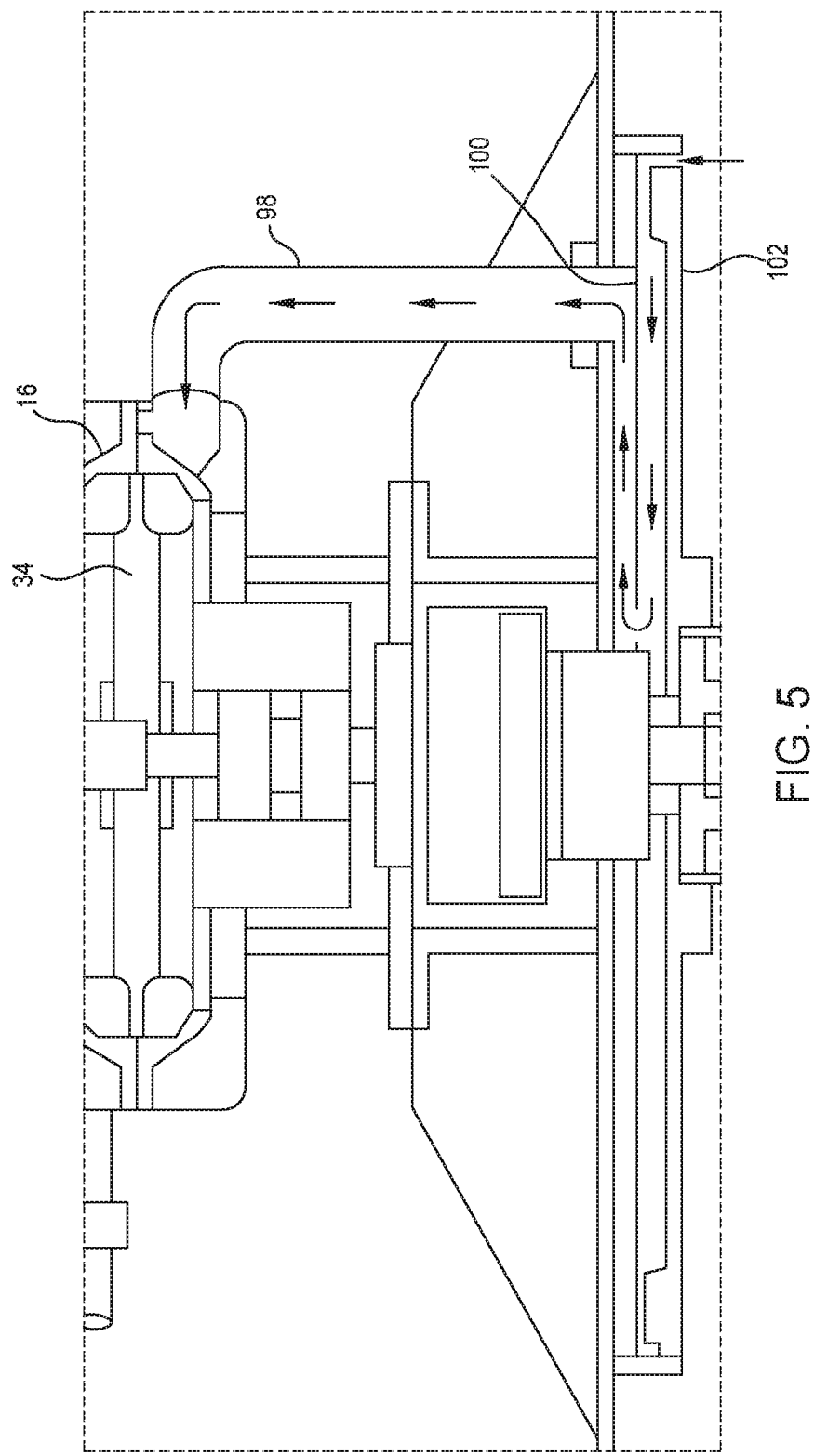
FIG. 5 is a schematic cross-sectional view of a vacuum blower, gas evacuation suction pipe, splatter plate and splatter disk of the degasser shown in FIG. 2.

FIG. 5 is a schematic cross-sectional enlarged view of the vacuum blower 16, gas evacuation suction pipe 98, splatter plate 100 and foam separation impeller 102 of the degasser 10 shown in FIG. 2. The impeller 34 of the vacuum blower 16 is rotated by the motor 14 to suck gases from the degassing chamber 12 of the pressure vessel 24 (see FIG. 2) via the gas evacuation pipe 98. When gases are being sucked out of the pressure vessel 24 (see FIG. 2) by the vacuum blower, the gases follow a sinuous path that starts at the outer edge of the foam separation impeller 102 and is between the foam separation impeller 102 and splatter plate 100. The gases flow through holes in splatter plate 100 and above splatter plate 100. The gases flow outward above the splatter plate 100 and enter the gas evacuation suction pipe 98. From the gas evacuation suction pipe 98, the gases enter the vacuum blower 16 and are pumped out of the degasser 10 by the vacuum blower 16.

In aspects of the present disclosure, the evacuation pump impeller 42 is of a size and turned at a rate sufficient to cause the evacuation pump 20 to have a discharge pressure, through the outlet conduit 66, of about 60 feet of water.

Example Operation of a Split-Flow Degasser

During drilling operations, operation of the vacuum blower 16 and the evacuation pump 20 by the motor 14 generates a vacuum in the degassing chamber 12 such that drilling fluid is sucked up the inlet conduit 62 into the degasser 10. A first portion of the drilling fluid exits the inlet conduit 62 laterally, i.e., follows the first path, and enters the evacuation pump 20. Gases dissolved in this first portion of the drilling fluid come out of solution due to the drilling fluid being exposed to the area of low pressure caused by operation of the evacuation pump 20. Gas bubbles in drops of drilling fluid (i.e., gases that are not dissolved) in this first portion separate from the drops when the drops are impacted by blades of the impeller 42 of the evacuation pump 20. The gases that come out of solution or separate from the drops flow toward the center of the impeller 42 and the slotted centrifuge tube 40 and then flow upward in the slotted centrifuge tube 40. The gases exit the slotted centrifuge tube 40 via the slots 41 and enter the degassing chamber 12. The vacuum blower 16 sucks the gases out of the degassing chamber 12 and pumps the gases out of the degasser 10. A second portion of the drilling fluid exits the inlet conduit 62 vertically, i.e., follows the second path, and flows into the slotted centrifuge tube 40. Rotation of the centrifuge tube 40 imparts rotary motion to the second portion of the drilling fluid. The second portion of the drilling fluid is also sucked upward in the slotted centrifuge tube 40 due to the low pressure in the degassing chamber 12. The rotary motion and vertical motion of the second portion of the second fluid causes the drilling fluid to exit the slotted centrifuge tube 40 via the slots 41, and the resultant flinging of the centrifuged drilling fluid results in the drilling fluid impacting on the inner walls of the degassing chamber 12 to degas the drilling mud. Exposure of the drilling fluid to the area of low pressure in the degassing chamber 12 also causes degassing of the drilling fluid. The second portion of the drilling fluid passes near the channel or gap between the top end of the inlet conduit 62 and the lower end of the slotted centrifuge tube 40 and may be partially degassed due to exposure of the drilling fluid to the low pressure area caused by the impeller 42. The gases released from the second portion of the drilling fluid near the gap flow up the slotted centrifuge tube 40 and into the degassing chamber. Gases released from the second portion of the drilling fluid due to impacting on the inner walls of the degassing chamber 12 are pumped out of the degassing chamber 12 by the vacuum blower 16. The degassed drilling mud in the degassing chamber 12 flows downward past the cross braces 48, into the drilling fluid chamber 22 of the pressure vessel 24, and then into drilling fluid inlet 60 of the housing 46 of the evacuation pump 20, where the impeller 42 pumps the now degassed drilling fluid (i.e., both the first portion and the second portion) through the outlet conduit 66, which empties into the second reservoir 83.

To provide a better understanding of the foregoing discussion, the above non-limiting examples are offered. Although the examples may be directed to specific embodiments, the examples should not be interpreted as limiting the invention in any specific respect.

Unless otherwise indicated, all numbers expressing quantities of ingredients, properties, reaction conditions, and so forth, used in the specification and claims are to be understood as approximations. These approximations are based on the desired properties sought to be obtained by the present invention, and the error of measurement, and should at least be construed in light of the number of reported significant digits and by applying ordinary rounding techniques. Further, any of the quantities expressed herein, including temperature, pressure, spacing, molar ratios, flow rates, and so on, can be further optimized to achieve the desired fluid flow rate and pressure.

While the foregoing is directed to embodiments of the present invention, other and further embodiments of the invention may be devised without departing from the basic scope thereof, and the scope thereof is determined by the claims that follow.

What is claimed is:

1. An apparatus for degassing drilling fluid, comprising:
a pressure vessel comprising:
   a top portion; and
   a bottom portion;
a vacuum blower in fluid communication with the pressure vessel;
a slotted centrifuge tube having a cross-sectional area;
a motor configured to rotate the slotted centrifuge tube;
an evacuation pump having an impeller connected with a lower end of the slotted centrifuge tube; and
an outlet conduit connected to the evacuation pump;
a drilling fluid inlet providing an opening between the bottom portion of the pressure vessel and the outlet conduit;
an inlet pipe having an internal diameter, the inlet pipe spaced a distance away from the lower end of the slotted centrifuge tube, a region between an upper end of the inlet pipe and the lower end of the slotted centrifuge tube having a circumferential surface area, the circumferential surface area of the region being $A_2=\pi DH$ where D is the internal diameter of the inlet pipe and H is the distance of the inlet pipe away from the lower end of the slotted centrifuge tube;
a mud tank, the pressure vessel being contained within the mud tank, the mud tank comprising:
   a first reservoir in fluid communication with the inlet pipe; and
   a second reservoir in fluid communication with the outlet conduit;
a threaded fastener connected to the inlet pipe to adjust the distance between the slotted centrifuge tube and the inlet pipe, wherein adjusting the distance adjusts fluid flow, wherein an internal diameter of the inlet pipe is selected according to a ratio between a cross-sectional area of the inlet pipe and the cross-sectional area of the slotted centrifuge tube, and wherein the distance between the upper end of the inlet pipe and the lower end of the slotted centrifuge tube is determined according to a ratio between the circumferential surface area of the region and the cross-sectional area of the slotted centrifuge tube;
a partition separating the first reservoir and the second reservoir of the mud tank, the partition having a gap therein to allow excess degassed drilling fluid to flow over the partition from the second reservoir to the first reservoir to avoid high pressure; and
a handling bracket attached to the motor allowing the pressure vessel to be lifted out of the mud tank.

2. The apparatus of claim 1, wherein the ratio between the cross-sectional area of the inlet pipe and the cross-sectional area of the slotted centrifuge tube comprises the cross-sectional area of the inlet pipe being about 1.8 times the cross-sectional area of the slotted centrifuge tube.

3. The apparatus of claim 1, wherein:
the inlet pipe has an internal diameter of about 8 inches; and
the slotted centrifuge tube has an internal diameter of about 6 inches.

4. The apparatus of claim 1, wherein the ratio between the circumferential surface area of the region and the cross-sectional area of the slotted centrifuge tube comprises the circumferential surface area of the region being about 0.8 times the cross-sectional area of the slotted centrifuge tube.

5. The apparatus of claim 1, wherein the distance between the upper end of the inlet pipe and the lower end of the slotted centrifuge tube is about 0.875 inches.

6. The apparatus of claim 1, wherein:
the evacuation pump has a pump cover having a lower opening, the lower opening having an internal radius at a lowermost extrema thereof;
an annulus between the inlet pipe and the internal radius of the lower opening of the pump cover has a cross-sectional area extending between an outer surface of the inlet pipe and an inner surface of the pump cover at the lowermost extrema of the lower opening; and
the internal radius of the lowermost extrema of the lower opening of the pump cover is determined according to a ratio between the cross-sectional area of the annulus and the cross-sectional area of the slotted centrifuge tube.

7. The apparatus of claim 6, wherein the ratio between the cross-sectional area of the annulus and the cross-sectional area of the slotted centrifuge tube comprises the cross-sectional area of the annulus being about 3.2 times the cross-sectional area of the slotted centrifuge tube.

8. The apparatus of claim 6, wherein the internal radius of the lowermost extrema of the lower opening of the pump cover is about 6.8 inches.

* * * * *